(12) United States Patent
Ruck

(10) Patent No.: US 8,600,523 B2
(45) Date of Patent: Dec. 3, 2013

(54) CONTROL OF AN OPERATION OF A COORDINATE MEASURING DEVICE

(75) Inventor: Otto Ruck, Pfahlheim (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 846 days.

(21) Appl. No.: 12/524,197

(22) PCT Filed: Jan. 21, 2008

(86) PCT No.: PCT/EP2008/000408
§ 371 (c)(1), (2), (4) Date: Jul. 23, 2009

(87) PCT Pub. No.: WO2008/089929
PCT Pub. Date: Jul. 31, 2008

(65) Prior Publication Data
US 2010/0100199 A1 Apr. 22, 2010

(30) Foreign Application Priority Data
Jan. 23, 2007 (DE) .......................... 10 2007 004 423

(51) Int. Cl.
| | |
|---|---|
| *G05B 11/01* | (2006.01) |
| *G05B 13/02* | (2006.01) |
| *G05B 11/32* | (2006.01) |
| *G06F 19/00* | (2011.01) |
| *G01C 17/38* | (2006.01) |

(52) U.S. Cl.
USPC ................ 700/12; 700/23; 700/28; 700/31; 700/32; 700/33; 700/67; 700/108; 700/192; 700/193; 702/94; 702/95

(58) Field of Classification Search
USPC .......................... 700/12, 192, 193; 702/94, 95
See application file for complete search history.

(56) References Cited

U.S. PATENT DOCUMENTS 3,267,434 A * 8/1966 Clark et al. ..................... 710/69
4,034,354 A * 7/1977 Simmons .......................... 700/7
(Continued)

FOREIGN PATENT DOCUMENTS

| DE | 3637410 A1 | 5/1988 |
|---|---|---|
| DE | 4330873 A1 | 3/1995 |

(Continued)

OTHER PUBLICATIONS

International Search Report dated May 26, 2008, 4 pages.

*Primary Examiner* — Kavita Padmanabhan
*Assistant Examiner* — Thomas Stevens
(74) *Attorney, Agent, or Firm* — Laurence A. Greenberg; Werner H. Stemer; Ralph E. Locher

(57) ABSTRACT

In a method for controlling an operation of a coordinate measuring device, at least one operational parameter is determined. One value of the operational parameter is allocated to a plurality of components. A sequence for determining the operational parameter is provided for the majority of the components. The method for determining the operational parameter in the predetermined sequence for each component is now described. It starts with the component that is first in the sequence: i) if the value of the operational parameter is allocated to the component, the value is adopted as a value of the operational parameter that is available for the operation, ii) if no value of the operational parameter is allocated to the components, one available value of the operational parameter that was available until then still remains available, iii) if another component is provided in the sequence, the method is carried out with the component.

13 Claims, 3 Drawing Sheets

(56) References Cited

U.S. PATENT DOCUMENTS

| | | | |
|---|---|---|---|
| 4,055,787 A * | 10/1977 | Beadle et al. | 318/591 |
| 4,073,247 A * | 2/1978 | Cunningham et al. | 112/470.07 |
| 4,190,889 A * | 2/1980 | Etoh et al. | 700/192 |
| 4,535,456 A * | 8/1985 | Bauer et al. | 714/31 |
| 4,639,653 A * | 1/1987 | Anderson et al. | 318/599 |
| 4,819,339 A * | 4/1989 | Kunzmann et al. | 33/503 |
| 4,888,877 A | 12/1989 | Enderle et al. | |
| 5,148,377 A * | 9/1992 | McDonald | 702/95 |
| 5,214,592 A * | 5/1993 | Serizawa et al. | 700/193 |
| 5,453,933 A * | 9/1995 | Wright et al. | 700/181 |
| 5,471,406 A * | 11/1995 | Breyer et al. | 702/168 |
| 5,478,426 A * | 12/1995 | Wiler et al. | 156/272.8 |
| 5,526,576 A | 6/1996 | Fuchs et al. | |
| 5,579,246 A * | 11/1996 | Ebersbach et al. | 702/95 |
| 5,737,244 A * | 4/1998 | Ruck | 702/153 |
| 5,753,983 A * | 5/1998 | Dickie et al. | 307/141.4 |
| 5,764,540 A * | 6/1998 | Grupp et al. | 702/153 |
| 5,950,011 A * | 9/1999 | Albrecht et al. | 717/167 |
| 6,158,136 A * | 12/2000 | Gotz et al. | 33/503 |
| 6,198,246 B1 * | 3/2001 | Yutkowitz | 318/561 |
| 6,501,997 B1 * | 12/2002 | Kakino | 700/28 |
| 6,591,146 B1 * | 7/2003 | Pavlovic et al. | 700/29 |
| 6,611,786 B1 | 8/2003 | Zhang et al. | |
| 6,650,946 B2 * | 11/2003 | Bauer | 700/23 |
| 6,961,625 B2 * | 11/2005 | Kamihira | 700/28 |
| 6,981,221 B2 | 12/2005 | Neudeck | |
| 6,992,767 B2 * | 1/2006 | Matsumoto et al. | 356/401 |
| 7,024,333 B2 * | 4/2006 | Rogele et al. | 702/155 |
| 7,050,937 B2 * | 5/2006 | Lee | 702/182 |
| 7,539,595 B2 * | 5/2009 | Georgi et al. | 702/150 |
| 2002/0002414 A1 * | 1/2002 | Hsiung et al. | 700/95 |
| 2003/0045964 A1 | 3/2003 | Lottgen et al. | |
| 2003/0139837 A1 * | 7/2003 | Marr | 700/110 |
| 2004/0098153 A1 | 5/2004 | Neudeck | |
| 2005/0263727 A1 | 12/2005 | Noda | |
| 2008/0004744 A1 | 1/2008 | Heinemann et al. | |
| 2009/0106546 A1 * | 4/2009 | Weichel et al. | 713/100 |
| 2011/0308066 A1 * | 12/2011 | Schroeder et al. | 29/558 |

FOREIGN PATENT DOCUMENTS

| | | |
|---|---|---|
| DE | 10340363 A1 | 5/2005 |
| DE | 102005016019 A1 | 10/2006 |
| EP | 0317967 A2 | 5/1989 |
| EP | 0940651 A2 | 9/1999 |
| EP | 1028306 A1 | 8/2000 |
| EP | 1422629 A2 | 5/2004 |
| WO | 0012964 A1 | 3/2000 |
| WO | 2006029994 A2 | 3/2006 |

* cited by examiner

CONTROL OF AN OPERATION OF A COORDINATE MEASURING DEVICE

BACKGROUND OF THE INVENTION

Field of the Invention

The invention relates to a controller and to a method for controlling operation of a coordinate measuring device.

Coordinate measuring devices may be operated in different configurations, components also being able to be exchanged and/or supplemented for a particular model of a coordinate measuring device. This applies, in particular, to the measuring head which can be moved in order to measure the coordinates and belongs, for example, to the switching type or to the probing type. However, the term coordinate measuring device is not restricted to devices in which a measuring head comes into contact with the object to be measured in order to measure the coordinates. Rather, the measurement can also be carried out by means of optical sensing or scanning, for example. Furthermore, a coordinate measuring device is also understood as meaning, in particular, a device which can determine dimensions of objects which still have to be converted into coordinates of a coordinate system.

On account of the different possible configurations, control of the coordinate measuring device must be adapted to the respective valid configuration if the configuration has changed.

In the linguistic usage of this description, the respective configuration of a coordinate measuring device is defined by the combination of the available components. In addition to hardware components, for example the measuring head or a special measuring table, a component is also understood as meaning, for example, a software component of the controller. Even objects which do not directly belong to the measuring arrangement and other factors which influence the measuring arrangement and/or measurement operation can be referred to as a component.

Accordingly, operating parameters which are constants that are characteristic of measurement operation in a particular configuration are not only machine parameters, for example machine dimensions of the coordinate measuring device, maximum accelerations, maximum speeds, speeds or forces when probing an object. Rather, the operating parameters also include, for example, positions or dimensions of the measuring arrangement or in the area of the measuring arrangement which are important for measurement operation, for example the position and type of a magazine in which different probe pins can be accommodated. Further additional devices and measuring aids whose position and type may be important for measurement operation are, for example, retainers for shafts of rotatable measuring tables. Such additional devices and measuring aids make particular areas inaccessible to the moving parts of a coordinate measuring device during measurement operation or result in local dependences of operating parameters, for example reduced speeds in the area close to objects.

In addition to operating parameters which may depend, in particular, on the location of the measuring head, may depend on the time and/or may also vary for a given configuration for other reasons, there is also information which is important for determining operating parameters, for example the information that people are in the area of the measuring arrangement and the measuring head must therefore be moved at a lower speed or with lower acceleration. Furthermore, there are rules for determining operating parameters which should be heeded before the start of measurement operation and/or only after the start of measurement operation. A rule which should already be heeded before the start of measurement operation is, for example, a rule for calculating the probing force when a measuring head of the coordinate measuring device is probing an object to be measured. A rule which should also be heeded after the start of measurement operation is, for example, the rule for reducing the maximum speed, at which the measuring head is moved, to a specified lower maximum value or for reducing it by a percentage depending on the presence of people in the area of the measuring arrangement (which can be automatically determined, for example, by means of light barriers). Further rules are, for example, those for reducing or restricting the probing speed of the measuring head or its starting acceleration and/or paths of the measuring head on the basis of the current position of the measuring head or a sensor in the measurement range of the machine. It is also possible to define complex rules which are implemented, for example, in software of a controller, with the result that, for example, the permissible speed or speed component, the acceleration or acceleration component, the probing force and/or additional operating parameters can be calculated, adapted and/or changed, for example, on the basis of the required accuracy when determining the coordinates, the softness of the material of the object to be measured, the diameter of a probe pin of the measuring head and/or additional information.

The operating parameters may be combined to form a common parameter set to which one or more rules for calculating the operating parameters can also be added. If the configuration of the coordinate measuring device changes, the problem of having to determine the operating parameter value which is then respectively adequate arises. In particular, operating parameters are in turn intended to be changed and/or restored to a state which was valid at an earlier point in time or for an earlier configuration. It is particularly problematic to change or restore the operating parameters if carrier components or systems for carrying measuring heads or sensors, the sensors or sensor systems themselves, additional devices and/or measuring aids (examples of these have already been mentioned) are added, removed or changed during measurement operation, in particular while measuring a particular object or an arrangement of objects. In particular, it is often the case that probe pins or combinations on the quill of a coordinate measuring device, rotary tables on which a measurement object can be rotated about an axis of rotation, retainers or magazines for probes are added, removed or changed. One example of such a rotary table is described in DE 3637 410 A1.

An example illustrates this: the maximum speed at which a machine can move a measuring head along the X axis of a coordinate system is 300 mm/s. On account of the presence of a retainer for a measuring table, only 128 mm/s are permissible generally or in a particular local area. However, an operating device which can be operated by personnel has a so-called override function, as a result of which speeds of the measuring head above 180 mm/s are currently impermissible. A carrier for the measuring sensor, which was introduced during the measuring operation, allows only a maximum speed of 70 mm/s on account of mechanical design properties and on account of local conditions. A probe changing plate is also present, with the result that it is possible to travel only with 50% of the maximum possible acceleration in the X direction in order to ensure reliable collision detection by the controller. This in turn has an effect on the braking distance and thus the maximum speed. Furthermore, the operator has reduced the maximum speed to 50 mm/s by programming the control software. The probe changing plate is now intended to be removed from the measurement area and replaced with a magazine for other measuring means whose presence could again reduce the maximum speed but in another manner. The practice of determining the maximum permissible speed which is now valid for moving the measuring head in the X direction is therefore associated with a considerable amount of effort.

BRIEF SUMMARY OF THE INVENTION

One object of the present invention is to specify a controller and a method for controlling a coordinate measuring device which make it possible to determine the operating parameters of the coordinate measuring device or of the measuring arrangement in a reliable and clear manner. In particular, different operating parameters in different configurations of coordinate measuring devices are intended to be able to be determined, in which case components which are at least partially identical or identical types of components are intended to be able to be used.

According to one aspect of the present invention, the operating parameters and/or the rules and/or information for determining the operating parameter are each defined with respect to a particular component. This makes it possible to concomitantly provide the corresponding data with the component or to retrieve said data, for example, if it is certain that the component is part of a particular configuration. However, in this case, the operating parameter can be determined from the data defined for the component only when one or more of the other components of the particular configuration are known. For example, a measuring head may permit different maximum speeds or accelerations depending on whether it is combined with a first coordinate measuring device or a second coordinate measuring device.

In particular, it is intended to be possible to be able to change settings (that is to say states) of the controller with respect to the determination and/or use of the operating parameters and also to be able to restore earlier states, for example if the earlier configuration is restored.

According to a second aspect of the invention, which can be combined with the first aspect, a data group is defined, in particular, for every optional and/or exchangeable component (but preferably for all components), which data group has all the data defined with respect to the component with regard to determining and/or using operating parameters. In addition, a corresponding data group may be defined for one or more basic components of a coordinate measuring device. Combining the data groups for those components which are part of a particular configuration therefore makes it possible to determine the respective parameter set which is valid overall for the configuration in a simple and reliable manner. In addition, the rules for determining and using the operating parameters, which are respectively valid for the configuration, can be determined from the data groups.

According to a third aspect of the invention, which can be combined with one or more of the other aspects, the procedure follows the method described below: a sequence is specified for the components or such a sequence has already been specified. Therefore, there is a component which is first in the sequence and at least one component which is last in the sequence. Only one component is preferably at each place in the sequence. However, the fact that two or more components are also at the same place in the sequence is not precluded.

Method actions for determining the operating parameters are carried out according to the sequence of components, which is not a sequence of a physical arrangement of the components but rather a logical sequence. A method action for determining an operating parameter is also understood as meaning a method action in which only an item of information for determining the operating parameter and/or a rule for determining the operating parameter are/is identified, are/is adopted as valid information or a valid rule and/or the rule is implemented.

One configuration of this aspect of the invention proposes the following:

A method for controlling operation of a coordinate measuring device, at least one operating parameter—for example the maximum speed, maximum acceleration, boundary location of a range of movement or limit value for signal detection—which is intended to be valid during operation being determined. The following steps are carried out:

a) a plurality of components of the coordinate measuring device are each assigned or can each be assigned a value of the operating parameter and/or a rule and/or information for determining the operating parameter, b) a sequence for determining the operating parameter is specified for the plurality of components, c) when determining the operating parameter in the specified determination sequence, the procedure is as follows for each component, the procedure starting with the component which is first in the sequence:

if the component has been assigned a value of the operating parameter, this value is adopted as the value of the operating parameter which is valid for operation, if the component has not been assigned a value of the operating parameter, a previously valid value of the operating parameter still remains valid, if there is a further component in the sequence, the procedure continues with this component.

The adoption of a new valid value may depend on the heeding of a rule which applies to the operating parameter.

When determining the operating parameter in the specified sequence, the following procedure may be alternatively or additionally carried out in step c), the procedure starting with the component which is first in the sequence:

if the component has been assigned a rule for determining the operating parameter, this rule is implemented and/or adopted as a valid rule, and/or, if the component has been assigned an item of information for determining the operating parameter, the information is adopted as valid information, if there is a further component in the sequence, the procedure continues with this component.

If a check is carried out both in order to determine whether an operating parameter should be adopted as a new valid operating parameter and in order to determine whether a rule and/or an item of information for determining the operating parameter should be adopted and/or the rule should be implemented, the sequence of components may be run through twice, the operating parameter being checked or new values of the operating parameter being adopted as valid values, if appropriate, in one run, and the rule and/or information being adopted or implemented in the other run. However, the sequence of components is preferably run through only once and, if a component is next, both a value of the operating parameter is adopted as a valid value and, if appropriate, a rule and/or information for determining the operating parameter are/is adopted as valid or the rule is implemented.

On the basis of the determination sequence which has been or is specified for the components, the correct parameter set or set of rules and information, which is valid for operation of the coordinate measuring device, can be determined without the need for complicated logic which takes into account all possible configurations from the start. Rather, a reliable execution rule is defined in the form of the sequence, with the result that earlier states which belong to earlier configurations can also be restored.

In particular, components or types of components which are not present at least in some of the possible configurations can be taken into account in the specified sequence. If the component or type of component is not present in a current configuration of the coordinate measuring device, it is not taken into account in method step c), that is to say, in particular, a check is not carried out for this component or type of component in order to determine whether a value of an operating parameter should be adopted as a valid value and/or in order to determine whether a rule and/or information for determining the operating parameter should be adopted as valid or the rule should be implemented.

However, it is also possible for there to be rules which are separate from the specified sequence and which clearly reveal the place in the sequence at which a component should be inserted if said component is included in the configuration. Conversely, there is no need for any rules for removing components since a component which is no longer present in a current configuration is simply removed from the sequence. The separate rules mentioned may consist, in particular, in the fact that the basic components, for example the actual coordinate measuring device with the associated drives, are first in the sequence, that additional devices and measuring aids, such as measuring tables and sensor or probe magazines, are next in the sequence in a specified manner, that carriers for carrying and/or moving measuring sensors, for example probe carriers, are next in the sequence, again in a specified manner, that the actual sensor (for example a probe or laser sensor) is next in the sequence, and that a program or program part for controlling operation of the coordinate measuring device is last, a user, for example, being able to specify the operating parameter for the program or for the program part. It is possible to specify, for example, for the carriers that the carrier that is directly fitted to the coordinate measuring device is first in the sequence and the subcarrier which is in turn fitted to said carrier and carries the actual sensor is only next in the sequence. The sequence of types of components therefore corresponds to the mechanical structure of the configuration of coordinate measuring devices. One example of an arrangement with a carrier and subcarriers is the rotating/pivoting device for probe heads of coordinate measuring devices having at least two motor-adjustable axes of rotation, which device is described in EP 0 317 967 and, according to FIG. 5 of said document, is fitted to a quill of a coordinate measuring device. The first housing part of the device, which is fitted to the coordinate measuring device, represents the carrier which carries a second housing part (the first subcarrier) which can be rotated about a first axis of rotation. A holder (the second subcarrier) which can be rotated about a second axis of rotation and to which a probe head, for example, can be attached is mounted in the second housing part.

A subcarrier is a device which is carried by a carrier and has properties of a carrier. As in the previously mentioned example, the subcarrier may allow the sensor to rotate with respect to the coordinate measuring device. The carrier or subcarrier may carry, for example, a probe head of the measuring type or another sensor. A sensor is understood as meaning a device or a system which scans a workpiece, for example in an optically and/or mechanically probing manner. The sensor may therefore be, for example, a camera, a tactile probe head or a simple probe pin on a changing plate.

In a configuration without a subcarrier, a sensor (for example a probe head of the measuring type with a changing interface for additional measuring devices) can be fitted to the carrier or can be directly fitted to the coordinate measuring device.

All possible components have preferably already been defined according to their types and the types of components have already been specified for a multiplicity of possible configurations in the sequence, with the result that, only for a specific configuration, it is only necessary to determine the type of component which is actually present. The specified determination order then undoubtedly results from the sequence of types of components.

In particular, it is possible for at least one of the components to be assigned a value of the operating parameter, the value depending on at least one further component and/or a combination of components. For example, a parameter of a carrier for sensors may depend on the type of base of the coordinate measuring device, that is to say the actual machine (for example the speed for probing the measurement object). Such parameters fall under the parameter category "target system parameters" which is still to be described below. Therefore, it is advantageous if the actual machine is before the components whose parameters may depend on the machine in the sequence of components. Otherwise, it is also possible, however, when executing the sequence for determining the operating parameters, to adopt a determination rule as valid (or a parameter which depends on other conditions) if the execution sequence for the corresponding component with the dependent parameter has been reached. Therefore, at least one of the components may be assigned a rule for determining the operating parameter, the rule depending on at least one further component and/or a combination of components.

A value of the operating parameter and/or a rule and/or information for determining the operating parameter may also be assigned or have been assigned to a type of component. Such parameters fall under the category "series-specific parameters" which is still to be explained.

A value of the operating parameter and/or a rule and/or information for determining the operating parameter may also be assigned or have been assigned to a particular model of a component. Such parameters fall under the category "individual parameters" which is likewise explained in yet more detail.

The invention also relates to a controller for a coordinate measuring device, in particular for carrying out the method according to the invention in any desired configuration described in this description.

The present invention also relates to a coordinate measuring device having such a controller.

The scope of the invention also includes a computer program having program code for carrying out the method according to one or more configurations of the present invention if the computer program runs on a computer. In this case, the program code may be in the form of source text, for example, with the result that it still has to be compiled, and/or may be in machine-readable form.

The scope of the invention also includes a data storage medium, with a (program) data structure which is designed to cause a computer to carry out the method according to one or more configurations of the present invention if the computer accesses the data structure being stored on the data storage medium.

The scope of the invention also includes a data storage structure which can be accessed by the controller or can be accessed when carrying out the control method. The data storage structure stores the operating parameters for the individual components, the information for determining the operating parameters and/or the rules for determining the operating parameters. In this case, a data group having data which contain the value of the operating parameter, the information for determining said operating parameter and/or the rule for determining the latter is defined for each of the components of the coordinate measuring device. In this case, each data group contains the data associated with a component and may be stored in the form of a file, for example. The data group may be dispensed with for a component for which there are no relevant data for determining the operating parameters.

In particular, each data group may be subdivided into subgroups, each of the subgroups having the data for one of the following categories of data:

Data for series-specific parameters. These parameters describe, in particular, properties of the component and are preferably provided with the component. If the component is exchanged or in the event of an update, such parameters may be exchanged or updated, in which case there is no need for the target system (that is to say the coordinate measuring device or the machine) to be known.

Target system parameters. These parameters depend on the target system or the target machine and are therefore preferably provided with the target system. In the event of an update, the corresponding component data record which is present in the target machine must therefore be maintained. If a component in a given target machine is exchanged for another component in the same series or of the same type, nothing changes in the target system parameter.

Individual parameters. These parameters describe the individual properties of a specific component. In particular, they may have an effect on a component which contains or carries the specific component with the individual properties. One example of such an individual parameter is the diameter or the eccentricity of a measuring sphere of a probing measuring head. Individual parameters thus contain information for adapting the component to the current configuration or the coordinate measuring device and are therefore often determined by means of appropriate programs and are stored for use.

Exemplary embodiments of the invention are now described with reference to the accompanying drawing. In the individual figures of the drawing:

DESCRIPTION OF THE INVENTION

Figure 1:
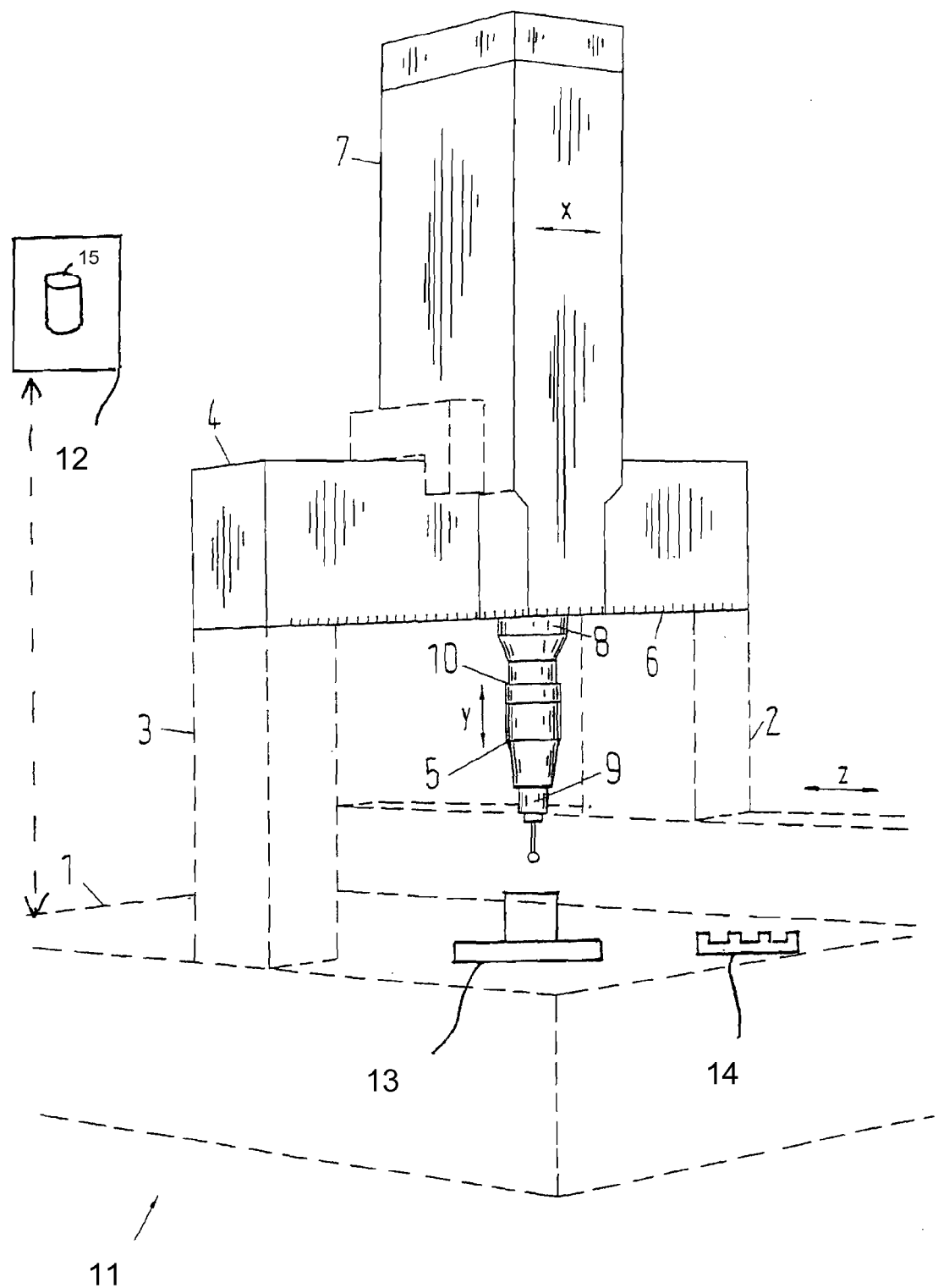
FIG. 1 shows a coordinate measuring device of portal design having a diagrammatically additionally illustrated controller for operating the coordinate measuring device, a magazine and a measuring table also being diagrammatically illustrated.

The coordinate measuring device 11 of portal design illustrated in FIG. 1 has a measuring table 1 over which columns 2, 3 can be moved, said columns forming, together with a crossbeam 4, a portal of the coordinate measuring device 11. The crossbeam 4 is connected to the columns 2 and 3 at its opposite ends, which columns are mounted on the measuring table 1 such that they can be displaced longitudinally.

The crossbeam 4 is combined with a cross-slide 7 which can move, on air bearings, along the crossbeam 4 (in the X direction). The current position of the cross-slide 7 relative to the crossbeam 4 can be determined using a scale subdivision 6. A quill 8 which can move in the vertical direction and whose lower end is connected to a sensor device 5 via a mounting device 10 is mounted on the cross-slide 7. A probe head 9 is arranged on the sensor device 5 such that it can be removed.

An additional rotatable measuring table 13, on which it is possible to arrange a measurement object which can be rotated by rotating the measuring table 13 about a vertical axis of rotation, is arranged on the measuring table 1. A magazine 14 in which different probe heads, which can be exchanged for the probe head 9, or in which different probe pins, which can be exchanged for the probe pin carried by the probe head 9, can be arranged is also arranged on the measuring table 1.

FIG. 1 also diagrammatically shows a controller 12 of the coordinate measuring device 11, which controller can be implemented, for example, by means of a computer which has software and at least one data memory 15 and is connected to driveable components of the coordinate measuring device, in particular drives, via signal and control lines. In addition, the controller 12 is connected, via a measured data connection, to those elements of the coordinate measuring device 11 which are used to determine the measured coordinate values. Since such elements and devices are generally known in the field of coordinate measuring devices, they are not discussed in any more detail here.

Figure 2:
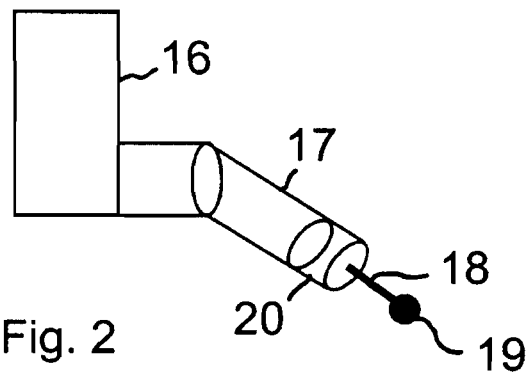
FIG. 2 shows a carrier to which a subcarrier is fitted, which subcarrier in turn carries a probe head as a sensor, FIG. 3 diagrammatically shows the sequence for determining operating parameters for a specified sequence of components, FIG. 4 diagrammatically shows a subgrouping of parameters into different parameter categories for a component.

FIG. 2 shows a carrier 16 having a subcarrier 17 which is fastened to the latter and carries a probe pin 18 having a measuring sphere 19. The carrier 16 may be fitted to the coordinate measuring device 11 illustrated in FIG. 1 instead of the sensor device 5, for example. The subcarrier is, for example, a rotating/pivoting joint which has, at the free end which is at the bottom on the right in FIG. 2, a changing plate 20 which allows the fitted probe pin 18 to be replaced.

Figure 5:
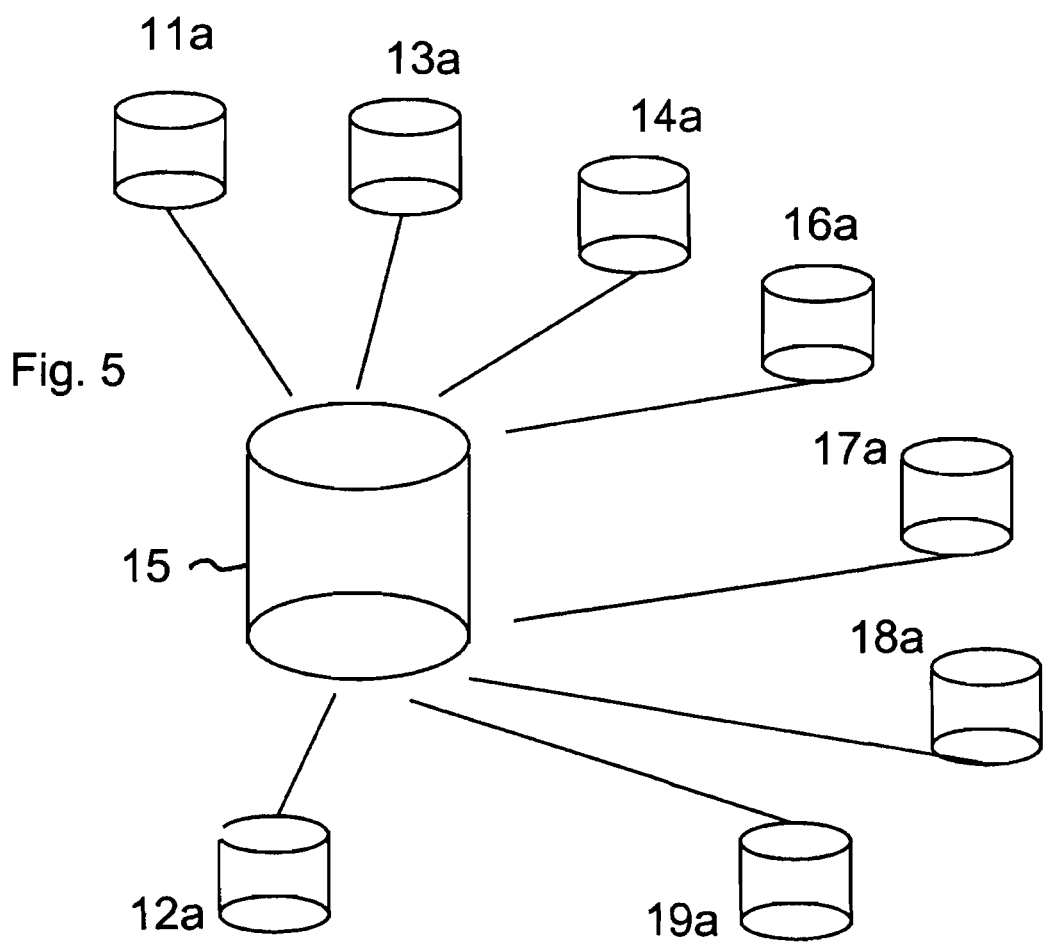
FIG. 5 shows a data storage structure.
Figure 3:
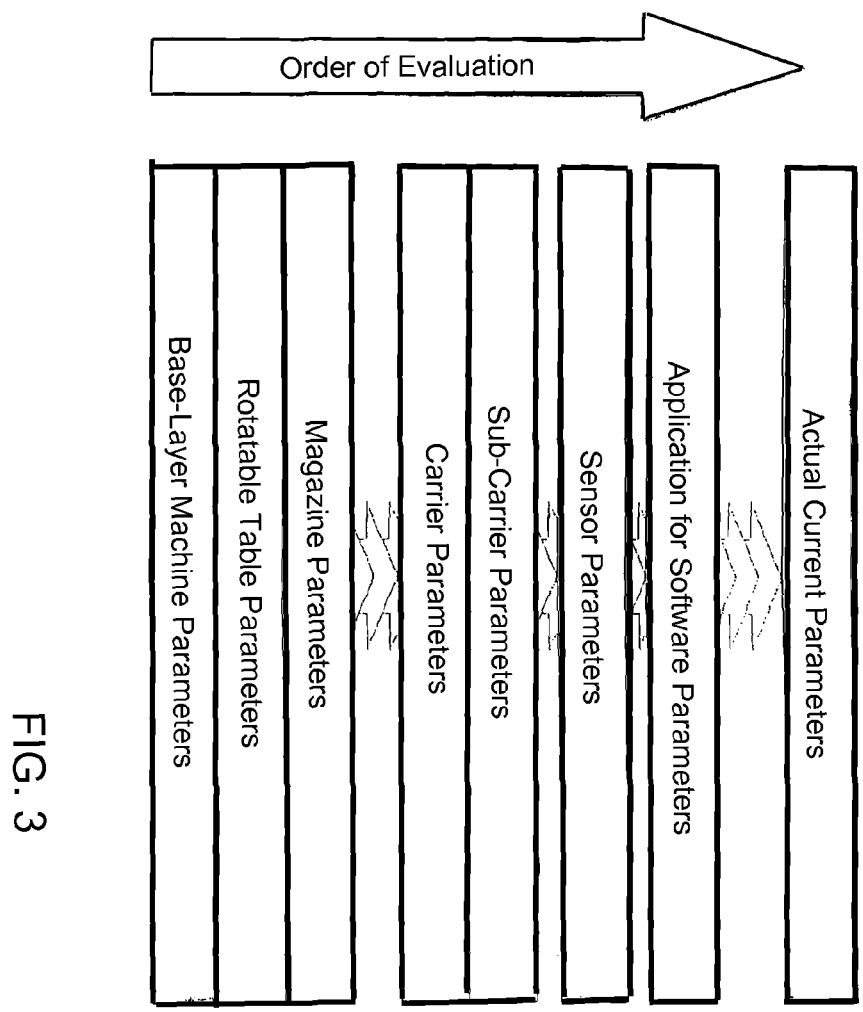
Figure 4:
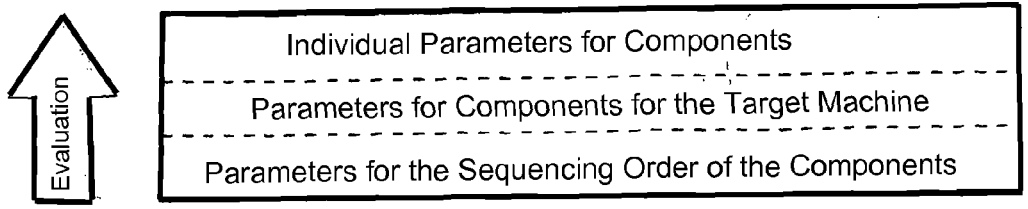

A preferred exemplary embodiment of the method according to the invention is now described using FIGS. 3 to 5.

FIG. 5 shows a data structure which is stored, for example, in the data memory 15 of the computer or controller 12 according to FIG. 1. The reference symbols with the small letter a at the end, that is to say 11a to 19a, relate to data groups which are each assigned to the component of the coordinate measuring device 11 (FIG. 1 and FIG. 2) with the same reference symbol but without the addition a. Therefore, 11a denotes the data group assigned to the coordinate measuring device 11 itself or the basic machine without the components which are specifically additionally arranged thereon, for example the carrier 16. 12a denotes the data group assigned to the controller 12. Each of the data groups 11a to 19a possibly, but not necessarily, contains operating parameters and rules and/or information for determining the operating parameters, the operating parameters, rules and information being assigned to the same data group for the respective component 11 to 19.

Each of the data groups 11a to 19a may store at least one operating parameter value, a rule for determining this operating parameter and/or an item of information for determining this operating parameter. Since there are generally a multiplicity of operating parameters, the sequence of components may be repeatedly run through in succession for each of the operating parameters in the procedure for determining the operating parameters which is described below. However, the data for a plurality of operating parameters or for all operating parameters in the data groups may also be evaluated in one run through the sequence. For simplicity, the text below refers only to one operating parameter. If a plurality of operating parameters are determined in one run through the sequence, it goes without saying that, in a subsequent step, the validity of the same operating parameter as in the preceding step is respectively checked or rules and/or information relating to the same operating parameter are adopted as now valid. However, it is also possible for information or values of another operating parameter to be important and to be used when using such a rule.

The preferred method sequence for determining a particular operating parameter is now described with reference to FIG. 3. The method according to the invention in which the sequence of components in a configuration of a coordinate measuring device is specified can also be referred to as a layer model or layer method. In this case, the first layer, which is lowermost in the illustration in FIG. 3, corresponds to the first component in the sequence. In the case of FIG. 3, this is the coordinate measuring device or machine. Therefore, the lowermost layer is referred to as the "base layer-machine parameters" in order to indicate that the machine parameters are first of all used as the basis for determining the parameter. The parameter is, for example, the maximum permissible speed along the X axis of a cartesian coordinate system of the coordinate measuring device, for example the X axis according to FIG. 1.

If a value of this operating parameter is present in the associated data group 11a, this value is adopted as the initially valid value of the operating parameter.

For a maximum speed, a value is generally defined in the data group for the machine.

The rotary table 13 is situated in the next layer or is next in the determination sequence. This is followed by the magazine 14, carrier 16, subcarrier 17, sensor or probe 19. The controller itself or the application software, which can be used to perform operations on that value of the operating parameter which was valid until then, for example in order to implement specifications given by the user, is at the top of the layer structure or is last in the sequence of components.

Irrespective of the exemplary embodiment described here, the method of the present invention preferably contains one or more of the following features:

If an operating parameter for a next layer or for the next component in the sequence of components is determined, a check is carried out in order to determine whether a value of the operating parameter has been defined for this component (for example is stored in the associated data group). If this is the case, the previously valid value of the operating parameter is replaced with this value, which has been defined for the component, as a new valid value of the operating parameter. If this is not the case, the previously valid value of the operating parameter remains valid. Alternatively or additionally, the process accordingly proceeds with a rule and/or information for determining the operating parameter, in which case a check is thus carried out in order to determine whether such a rule and/or information have/has been defined for the component in the current layer or the component at the current place in the sequence. In this case, it is also possible for the rule to contain the instruction to concomitantly include a rule for the operating parameter from a lower layer and/or to concomitantly take into account an item of information from a lower layer. The layer method can therefore be compared with a number of transparent films which each optionally have an item of information at a particular local position and are placed on top of one another. At that local position, that transparent film which, as the highest layer, contains an item of information determines the information which is visible from above. It covers all information contained at this local position in lower layers. To return to the example of the maximum speed in the direction of the X coordinate axis, the maximum speed which is still valid from the machine is covered, for example, in the layer of the probe 19 ("sensor parameters") if no value was defined for this maximum speed in the intermediate layers.

The controller itself or a program or program part of the controller is preferably always arranged in the layer structure or sequence of components independently of other features of the method according to the invention. This makes it possible for the controller to carry out individual corrections on the operating parameter or further calculations of the operating parameter.

The machine or the actual coordinate measuring device without the components which can usually be replaced is preferably always arranged first in the sequence, that is to say as the lowermost layer.

If the configuration of the coordinate measuring device is changed and a component is physically removed, for example, the corresponding component or layer is removed from the sequence of components or the structure of the layers. If, for example in the previously described example, the probe head 19 is removed and is replaced with a sensor for which no values need to be defined, the valid value originating from the machine remains valid, at least to the layer of the application software or controller 12.

If a component is added in the event of a change to the configuration, the layer is inserted at a place in the layer structure, preferably at the place specified by a sequence of types of components. The sequence of types of components is preferably defined by the hardware structure of possible configurations or is oriented thereto.

One example of a rule for determining an operating parameter is the rule which is already contained, in particular, in the lowermost layer and states that the associated operating parameter in the higher layers can be reduced (or increased in the case of another operating parameter) but not increased (or reduced in the other case). The maximum permissible speed of the measuring head can no longer be increased in higher layers, for example, but can only be reduced.

FIG. 4 shows that different operating parameters which can be classified into the different parameter categories already explained can be taken into account at least in one of the layers. Alternatively, the rectangular box which is edged with the uninterrupted frame line in FIG. 4 can also be interpreted as a data group in the data structure according to FIG. 5, for example as the data group 17a. The arrow "evaluation" on the left in FIG. 4 does not mean that the parameters inside the box are intended to be evaluated from the bottom to the top. Rather, the arrow refers to the fact that the operating parameters can be taken into account as part of the same layer during the evaluation which is diagrammatically illustrated in FIG. 3.

The invention claimed is:

1. A method for controlling operation of a coordinate measuring device, which comprises the steps of providing a controller configured to perform on a basis of at least one operating parameter of the coordinate measuring device, said controller having a determination device for determining the at least one operating parameter intended to be valid during operation, and performing the following steps with the controller:
- a) determining at least one operating parameter which is intended to be valid during operation;
- b) assigning each of a plurality of components of the coordinate measuring device at least one of a value of the operating parameter, a rule for determining the value of the operating parameter or information for determining the value of the operating parameter;
- c) specifying a sequence for determining the operating parameter for the plurality of components which results in a specified determination sequence;
- d) when determining the operating parameter in the specified determination sequence, performing a procedure as follows for each component, the procedure starting with the component which is first in the specified determination sequence:
  - d1) if the component has been assigned a given value for the operating parameter, the given value is adopted, optionally depending on the rule for determining the value of the operating parameter, the rule being valid for the operating parameter, as the value of the operating parameter which is valid for operation and thus substituting for a previously valid value of the operating parameter;
  - d2) if the component has not been assigned the given value of the operating parameter, the previously valid value of the operating parameter still remains valid as the value of the operating parameter;
  - d3) if the component has been assigned a given rule for determining the operating parameter, the given rule is at least one of:
    - adopted as a valid rule for determining the operating parameter; or
    - implemented;
  - d4) if the component has been assigned given information for determining the operating parameter, the given information:
    - is adopted as valid information for determining the operating parameter; or
    - is used; and
  - d5) if the component is not a last component in the specified determination sequence, the procedure continues at step d1) for a next component in the specified determination sequence.

2. The method according to claim 1, wherein, in step c), one of at least one component or one type of component which is not part of the coordinate measuring device in every possible configuration of the coordinate measuring device is also included in the specified determination sequence, and in which, in step d), one of the component or the one type of component is taken into account only when the component or at least one component of the one type of component is present in a current configuration of the coordinate measuring device.

3. The method according to claim 1, wherein in step b) assigning at least one of the operating parameter, values depending on one of at least one further component and a combination of components, and at least one of the components is assigned the rule for determining the operating parameter, the rule depending on at least one of the one further component and the combination of components.

4. The method according to claim 1, wherein in step b), assigning to a type of component at least one of value of the operating parameter, the rule for determining the operating parameter or the information for determining the value of the operating parameter.

5. The method according to claim 1, which further comprises assigning to a particular model of a component at least one of the value of the operating parameter, the rule for determining the operating parameter or the information for determining the value of the operating parameter.

6. The method according to claim 1, which further comprises, when a configuration of the coordinate measuring device has changed, carrying out step d) again for a changed configuration.

7. The method according to claim 1, wherein one of the components for which the specified determination sequence is specified is one of a program or a program part for controlling operation of the coordinate measuring device, a user being able to specify the operating parameter for one of the program or the program part.

8. The method according to claim 1, which further comprises selecting the at least one operating parameter from the group consisting of maximum speed, maximum acceleration, boundary location of a range of movement, and a limit value for signal detection.

9. A control system for a coordinate measuring device, the control system comprising:
  a controller configured to perform on a basis of at least one operating parameter of the coordinate measuring device, said controller having a determination device for determining the at least one operating parameter intended to be valid during operation, said controller configured to:
  - a) one of respectively assign at least one of a value of the operating parameter, a rule for determining the operating parameter, or information for determining the operating parameter to a plurality of components of the coordinate measuring device;
  - b) one of specify a sequence for determining the operating parameter for the plurality of components or proceed according to a specified sequence for determining the operating parameter;
  - c) proceed as follows for each component when determining the operating parameter in the specified sequence, the procedure starting with a component which is first in the specified sequence:
    - c1) if the component has been assigned a given value of the operating parameter, the given value is adopted, optionally depending on the rule for determining the value of the operating parameter and the rule being valid for the operating parameter, as the value of the operating parameter that is valid for operation and thus substituting for a previously valid value of the operating parameter;
    - c2) if the component has not been assigned the given value of the operating parameter, the previously valid value of the operating parameter still remains valid as the value of the operating parameter;
    - c3) if the component has been assigned the rule for determining the operating parameter, the given rule is at least one of:
      - adopted as a valid rule for determining the operating parameter; or
      - implemented;
    - c4) if the component has been assigned given information for determining the operating parameter, the given information:
      - is adopted as valid information for determining the operating parameter; or
      - is used; and c5) if the component is not a last component in the specified sequence, the procedure continues at step c1) for a next component in the specified sequence.

10. The controller system according to claim 9, wherein said controller has one of a program or a program part which is executed during a determination of the at least one operating parameter and is one of the components for which the specified sequence is specified.

11. The controller according to claim 10, wherein said controller is configured such that a user can specify the operating parameter for one of the program or the program part.

12. The controller according to claim 9, wherein the operating parameter of the coordinate measuring device is selected from the group consisting of maximum speed, maximum acceleration, boundary location of a range of movement, and limit value for signal detection.

13. A coordinate measuring device, comprising:
a controller configured to perform on a basis of at least one operating parameter of the coordinate measuring device, said controller having a determination device for determining the at least one operating parameter intended to be valid during operation, said controller configured to:
a) one of respectively assign at least one of a value of the operating parameter, a rule for determining the operating parameter, or information for determining the value of the operating parameter to a plurality of components of the coordinate measuring device;
b) one of specify a sequence for determining the operating parameter for the plurality of components or proceed according to a specified sequence for determining the operating parameter;
c) proceed as follows for each component when determining the operating parameter in the specified sequence, the procedure starting with a component which is first in the specified sequence:
  c1) if the component has been assigned a given value of the operating parameter, the given value is adopted, optionally depending on the rule for determining the value of the operating parameter and the rule being valid for the operating parameter, as the value of the operating parameter that is valid for operation and thus substituting for a previously valid value of the operating parameter;
  c2) if the component has not been assigned the given value of the operating parameter, the previously valid value of the operating parameter still remains valid as the value of the operating parameter;
  c3) if the component has been assigned a given rule for determining the operating parameter, the given rule is at least one of:
    adopted as a valid rule for determining the operating parameter; or
    implemented;
  c4) if the component has been assigned given information for determining the operating parameter, the given information is one of:
    adopted as a valid information for determining the operating parameter; or
    used; and
  c5) if the component is not a last component in the specified sequence, the procedure continues at step c1) for a next component in the specified sequence.

* * * * *